May 22, 1934.    W. NYCE    1,960,195
STRAP PUDDLING MACHINE AND PROCESS
Filed May 5, 1931    4 Sheets-Sheet 1

WITNESS:

INVENTOR
Wallace Nyce
BY
Augustus B. Stoughton
ATTORNEY.

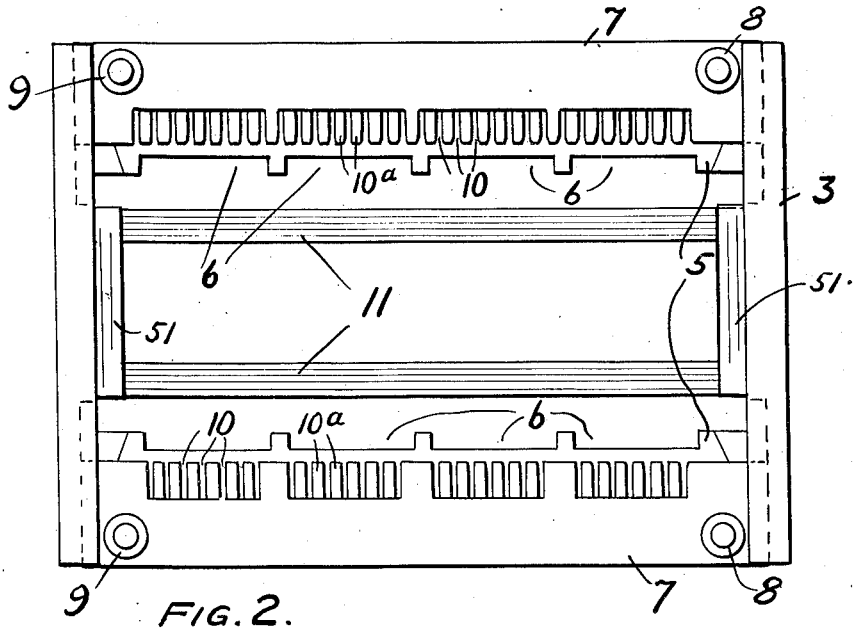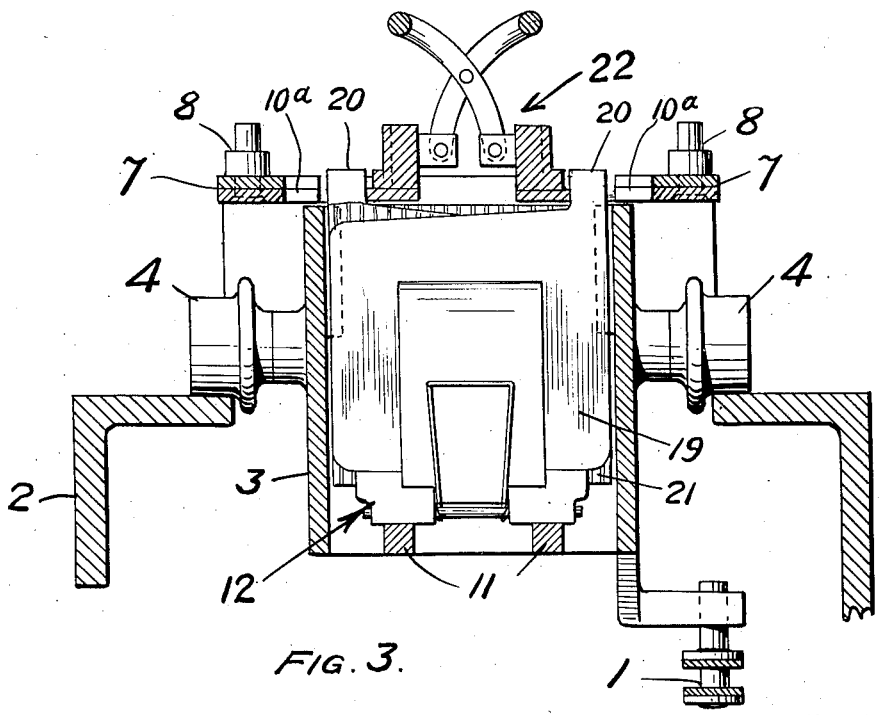

May 22, 1934.  W. NYCE  1,960,195
STRAP PUDDLING MACHINE AND PROCESS
Filed May 5, 1931  4 Sheets-Sheet 3
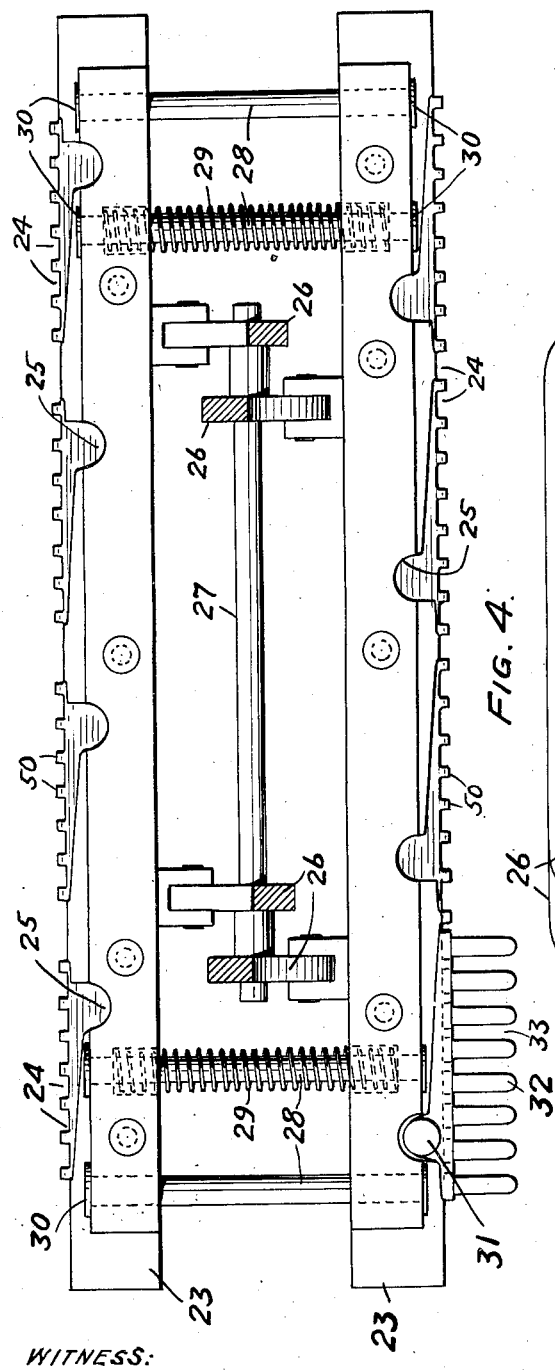
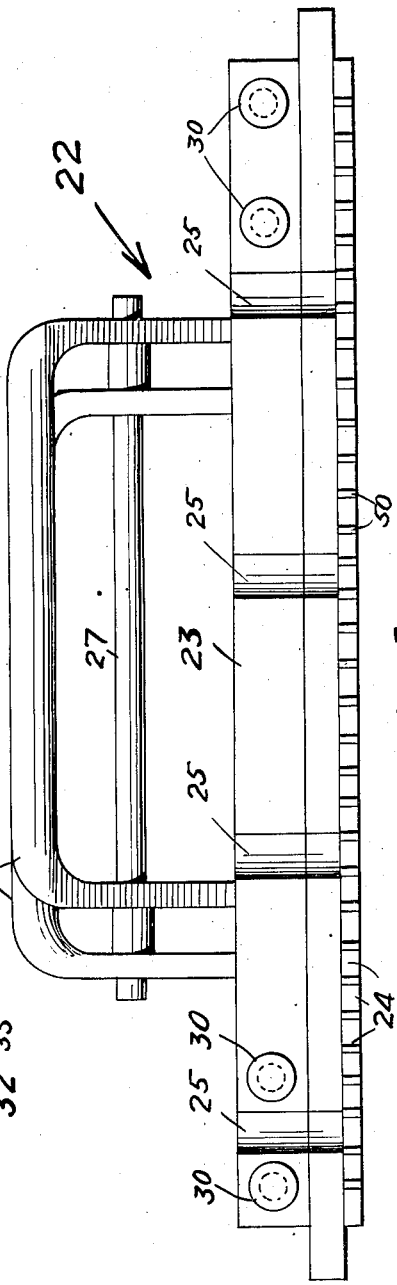
INVENTOR
Wallace Nyce
BY
Augustus B. Stoughton
ATTORNEY.
WITNESS:
Robt R Kitchel May 22, 1934.　　　　　W. NYCE　　　　　1,960,195
STRAP PUDDLING MACHINE AND PROCESS
Filed May 5, 1931　　　　4 Sheets-Sheet 4

WITNESS:
Rob R Mitchel

INVENTOR
Wallace Nyce
BY
Augustus B. Stoughton
ATTORNEY.

Patented May 22, 1934

1,960,195

UNITED STATES PATENT OFFICE 1,960,195

STRAP PUDDLING MACHINE AND PROCESS

Wallace Nyce, Philadelphia, Pa., assignor to The Electric Storage Battery Company, Philadelphia, Pa., a corporation of New Jersey Application May 5, 1931, Serial No. 535,185

12 Claims. (Cl. 113—59)

My device is a means for assembling the plates, separators and connecting straps which form parts of electric storage batteries into the relative positions which they occupy in the finished storage battery and then, by means of a gas flame, welding or puddling the straps to the terminal lugs of the plates.

This welding or puddling process is termed, in the art, "lead-burning", and consists in applying a flame to the confronting or adjacent surfaces of the parts to be joined until the molten metal runs together, additional metal being often supplied from a strip of metal held in the flame during the process. In order to retain the molten metal in place until it has solidified, removable barriers of suitable shape, called "burning irons" are used.

In carrying out the assembly of storage batteries it has heretofore been customary to assemble the positive and negative plates into separate groups by lead-burning the plate lugs to the respective straps, then intermesh the two groups and insert the separators. The separators in the finished cell extend above the tops of the plates with their upper edges abutting against the under side of the straps, this arrangement preventing the separators from floating up out of position after the electrolyte is added. On this account it has been customary to insert the separators after the lead burning operation has been completed to avoid injuring the separators by the heat.

In the device and process of my invention, I provide a specially designed jig or clip in which the separate positive and negative plates with intervening separators are assembled in their proper order, with provision for displacing and protecting the separators during the burning operation and then restoring them to their normal position in the assembly.

This process is performed in the following steps: The positive and negative plates are assembled in a clip with separators between them. The clip is provided with slots vertical in depth in its base, registering with the lower edges of the separators. The clip will contain the number of plates both positive and negative which form a positive plate group and a negative plate group with separators there between and which together form the entire active elements of one cell of a storage battery. The separators are then tapped lightly on their upper surface whereby they are caused to drop into the slots in the base of the clip, assuming a position below their normal position relative to the plates. The clips and the plates therein are then placed in a burning box and outside and inside burning irons are placed adjacent the lugs on the plates. Lead-alloy castings which form the positive and negative terminal post and strap elements are then placed in contact with the corresponding plate lugs, and the strap and lugs are lead burned or puddled together by means of a hot flame. If desired, additional lead may be melted in during this operation. The inside and outside irons are removed and the finished element is lifted out of the box and removed from the clip in which it is contained. The assembled element is then lightly tapped on the bottom surface and the separators thereby restored to their proper position between the positive and negative plates with their upper edges against the under side of the straps, and the element is then ready for insertion in a storage battery cell.

My invention consists in improved devices for performing the above functions. These consist in a clip having spring sides and a corrugated bottom to receive the separators. My device also includes a burning box adapted to contain the clips and the plates therein and having outside irons slidable into contact with the lugs on the plates. My device also includes an inside burning iron adapted to be placed on the top of said box adjacent the lugs on the plates. My device may be used as a stationary device or may, as illustrated, be mounted on a conveyor for performing the work in an assembly line.

For a further exposition of my invention reference may be had to the annexed drawings and specification at the end whereof my invention will be specifically pointed out and claimed.

In the drawings,

Figure 2 is a top plan view of the burning box.

Figure 3 is a vertical cross section through my device including the burning box and the inside iron, showing a clip with plates and separators in place.

Figure 4 is a top plan view of the inside burning iron with parts broken away.

Figure 5 is a side elevation of the device as shown in Figure 4.

Figure 1:
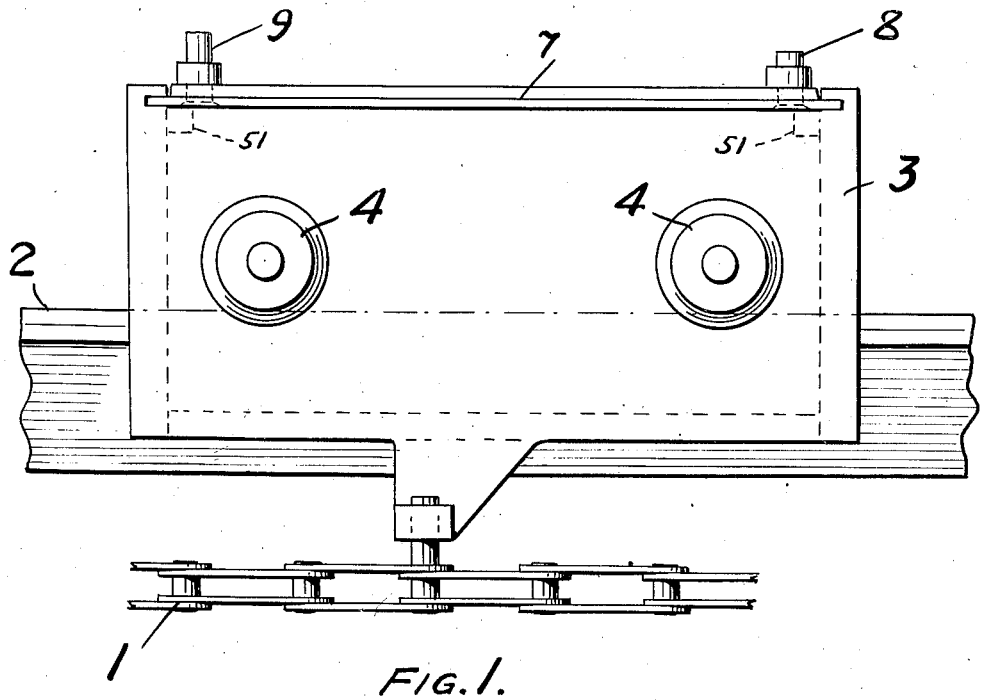
Figure 1 is a side elevation of the burning box.

In the embodiment of my invention, chosen for illustration in the drawings, my device is shown as consisting of a conveyor belt or chain 1 which is mounted to move in an endless horizontal path and to thereby provide an assembly line for assembling the plate groups and attaching the terminal posts and straps thereto. Adjacent to the conveyor 1 there are provided rails 2 on which are adapted to ride the burning boxes (generally indicated at 3) by means of the rollers 4.

Figure 10:
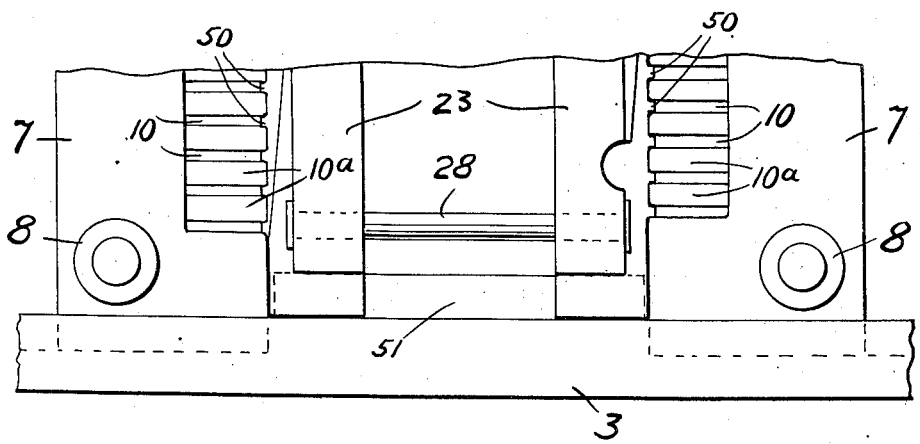
Figure 10 is a partial top plan view of the inside iron and burning box.
Figure 6:
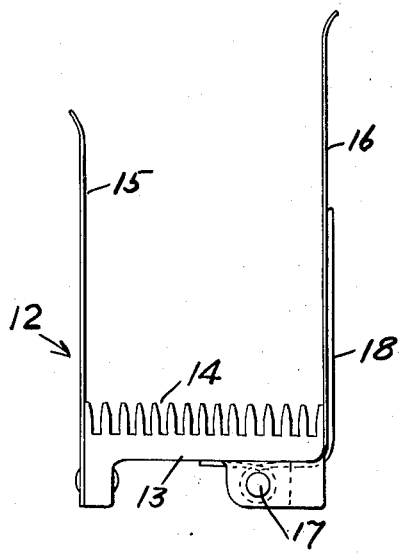
Figure 6 is a side elevation of the clip.
Figure 7:
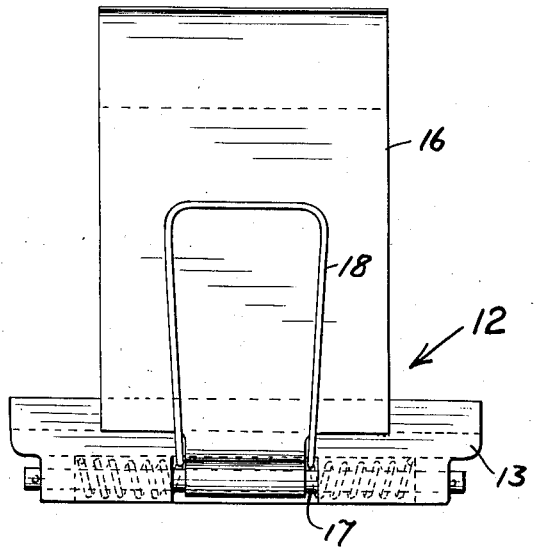
Figure 7 is an end elevation of the clip.

Referring more particularly to Figures 1, 2, 3, and 10, the burning boxes 3 are shown as consisting of a hollow box generally rectangular in shape and of which the inner side walls 5 are provided with a plurality of notches 6 adapted to receive a plate group in each notch. Above the side walls 5 there are provided outer burning irons 7 which have cam followers 8 and 9 projecting therefrom for moving the outer irons in and out. The outer irons 7 have on their inner surfaces in alinement with notches 6 a portion formed with a plurality of notches 10 each of which is adapted to receive the lug 20 of a storage battery plate therein. It will be noted from Figure 2 that one of the irons 7 has the notches 10 arranged seven in a group while the other iron 7 has notches 10 arranged eight in a group. This is because the irons are adapted to receive the lugs of the positive and of the negative plate groups respectively and these plate groups consist of a different number of plates. Burning boxes 3 are provided at their bottoms with a pair of upstanding bars 11 which serve to support the bases of the clips holding the plate groups within the boxes. The burning boxes 3 are provided on their inner end walls with supports 51 adjacent the top edges thereof. The supports 51 serve as supports for the ends of the inner burning iron, generally indicated at 22, as is best seen in Figure 10.

Figure 8:
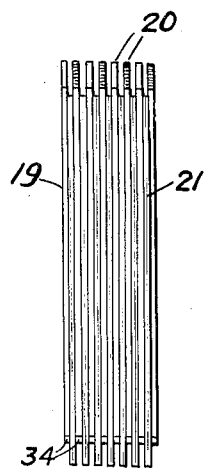
Figure 8 is an end elevation of the plate group before the terminal post and strap are attached.
Figure 9:
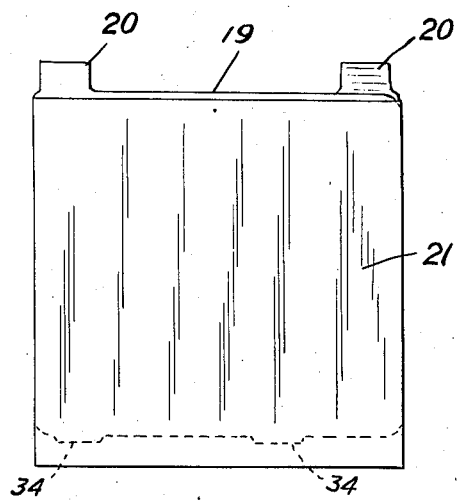
Figure 9 is a side elevation of the plate group.

Referring now more particularly to Figures 3, 6, 7, 8 and 9, there are disclosed clips generally indicated at 12 which provide means for assembling the positive and negative plates with separators between them. The clips 12 consist of a bottom or base portion 13 having a plurality of notches or corrugations 14 therein. On one side of the bottom 13 there is mounted a short spring wall 15. At the other side of the bottom 13 there is mounted at relatively tall wall 16 which is connected to bottom 13 by a pivot 17 and is stressed against the end of bottom 13 by spring 18. When the positive and negative plate groups are assembled in the clip with separators between them, spring 18 serves to retain the plate groups in the clip. Figures 8 and 9 show, in the position which they occupy in the clips, storage battery plates generally indicated at 19 having upstanding lugs 20 on their upper surfaces and feet 34 on their lower surfaces. These figures also show between the plates 19, separators 21 which may be of wood, threaded rubber or any other suitable acid resisting material. In Figure 3 clip 12, with plates and separators therein, is shown resting on the ribs 11.

Having reference now particularly to Figures 3, 4 and 5, there is shown the inside burning iron, generally indicated at 22. This inside burning iron consists of a pair of bars 23 having portions formed of notches 24 separated by projections 50 and also having recessed portions 25 on their outer surfaces. On the inner surfaces of bars 23 there are pivotally mounted handles 26 which are pivoted together on a pivot 27, so that movement of the handles 26 correspondingly moves the bars 23 toward and away from each other. Bars 23 have horizontal orifices near their ends in which are mounted guide rods 28 which serve to cause the bars 23 to move parallel to each other. Springs 29 stress the bars 23 to their extreme separated position in which they are held by heads 30 on the bars 28.

There is also shown in Figure 4 a casting of lead or lead alloy which includes the terminal post portion 31 and the strap portion 32. These castings are adapted to be assembled over the notched portions 24 in the recessed portions 25 and to be thereby located adjacent the lugs 20 on the plates and opposite the outside burning irons 7. The notched portions 10 of the outer irons 7 hold the sides of the plate lugs 20 in position and support the strap portion 32 of the castings with the plate lugs projecting into the recesses 33 of the casting.

The operation of my device is as follows: The plates for an element assembly, positives and negatives alternating, are stacked with the separators between them, the lugs 20 of the positive plates on one side and those of the negative plates on the other, and the stack is placed in the jig or clip 12. The separators are then pushed or tapped down until their lower edges project into the notches 14 in the base 13. The clip with the plate and separator stack in position is then inserted in the burning box 3 with its base resting on the bars 11. The opposite sides of the stack formed by the vertical edges of the plates and separators fitting into opposite notches 6. The outer irons 7 are then moved to inner position by the pressure of cams on cam followers 8 and 9 or in any other suitable manner, the tongues 10ª passing between the plate lugs 20, these lugs thus fitting into the notches 10 and projecting a certain distance above the tongues 10ª, as shown in Fig. 3. Inner iron 22 is then placed in position on the top of box 3 so that the projections 50 enter the grooves 10 of the outer irons 7 and bear against the inner vertical edges of the plate lugs 20. The strap and terminal post casting (elements 31 and 32) are then placed in position on top of the outer irons 7 and the bars 23 of the inner iron. In this position the strap portion 32 is in contact with the lugs 20 of the plates, these lugs projecting into the notches 33 of the strap casting. The strap portion 32 and the lugs 20 are then burned or puddled or melted together by means of a hot flame. This can be done by manually placing a hot flame on the strap portion 32 and the lugs 20 or by conveying box 3 and the elements carried thereby beneath one or more hot flames or by a combination of these methods. During this operation, if desired, additional lead or alloy may be melted to the strap portion 32. The outer irons 7 are next retracted to their outer position by means of the action of cams on the cam followers 8 and 9 or in any other convenient manner. The clips 12 and the plate groups contained therein may then be lifted out of the box 3 by lifting the center iron 22. The center iron 22 is then removed by squeezing the handles 26 together which retracts the side bars 23 so that the iron may be lifted off the element. The element is then released and removed from the clip. As will be seen from Figures 8 and 9, when the element is removed from the clip the separators 21 project below the bottoms of the plates 19 but by means of a light pressure on their bottoms they may be inserted to their proper position between the plates 19 with their tops in proximity or touching the under side of the straps and their bottoms flush with the feet 24 on the under side of the plates. The complete plate assembly groups, which form the entire active elements of a single cell of a storage battery, are then ready for insertion into the storage battery cell.

I do not intend to be limited in the practice of my invention save as the scope of the prior art and the appended claims may require.

I claim:

1. A device for assembling the terminal posts and straps to storage battery plates which comprises, in combination, a clip adapted to receive the positive and negative plates having lugs thereon and the separators between them, a burning box adapted to receive the clips and the plates therein, outer burning irons mounted on said box, and inner burning irons freely detachable from said box, said outer and inner burning irons cooperating together to surround said lugs and to underlie said straps.

2. A device for assembling the terminal posts and straps to storage battery plates which comprises, in combination, a clip having a pivoted side wall and a corrugated bottom portion for receiving the positive and negative plates having lugs thereon and the separators between them, the separators fitting into the corrugations in said clip so as to be depressed below their normal positions, a burning box adapted to receive the clips and the plates therein, outer burning irons, and inner burning irons, said outer and inner burning irons cooperating together to surround said lugs and to underlie said straps and protect the separators during the burning operation.

3. A device for assembling the terminal posts and straps to storage battery plates which comprises, in combination, a clip for receiving positive and negative plates having lugs thereon and separators between them, a burning box adapted to receive the clips and the plates therein, said burning box having in its bottom supports for said clips, outer burning irons slidably mounted in the upper portion of said burning box, and inner burning irons freely detachable from said box, said outer and said inner burning irons cooperating together to surround said lugs and to underlie said straps and protect the separators during the burning operation.

4. A device for assembling the terminal posts and straps to storage battery plates which comprises, in combination, a clip for receiving positive and negative plates having lugs thereon and separators between them, a burning box for receiving said clips and said plates therein, outer burning irons mounted on said box, inner burning irons freely detachable from said box, said outer and inner burning irons cooperating together to surround said lugs and to underlie said straps, and a handle for moving said inner burning irons toward or away from each other.

5. A clip for assembling storage battery positive and negative plates with the separators between them comprising, in combination, a body having a plurality of grooves for receiving the bottom edges of the separators therein, a spring wall upstanding from one end of said body, a wall upstanding from the opposite end of said body and pivotally connected thereto, and a spring for urging said last mentioned wall against the end of said body.

6. An inner burning iron for assembling storage battery negative and positive plates with separators between them, said iron comprising, a pair of bars, notched portions on the outer edges of said bars, handles pivotally connected to said bars, a common pivot for said handles, guide means for causing said bars to move parallel, means for stressing said bars to a position in which they are spaced apart, and means for limiting said last mentioned movement.

7. A process for manufacturing storage battery plate elements, which includes the following steps: assembling positive and negative plates with the separators of the ultimate assembly between them but displaced below the position which they occupy in the finished battery; puddling straps onto the plate lugs in the assembled group; and moving the separators into their normal position.

8. A process for assembling storage battery plate elements, which process includes the following steps; assembling the positive and negative plates with the separators of the ultimate assembly between them into the position they occupy in the finished battery; sliding the separators vertically away from plate lugs; puddling straps onto the plate lugs when the plates are in assembled position, and sliding the separators vertically back into the position they occupy in the finished battery.

9. A device for assembling the terminal posts and straps to storage battery plates which comprises, in combination, a clip adapted to receive the positive and negative plates having lugs thereon and the separators vertically displaced between them, a conveyor, a burning box attached to said conveyor and adapted to receive the clips and the plates therein, outer burning irons, and inner burning irons, said outer and inner burning irons cooperating together to surround said lugs and to underlie said straps.

10. A jig for holding the assembly of positive and negative plates and the permanent separators for the completed cell, said jig being provided with means for accommodating a definite downward displacement of the separators from their final position with respect to the plates while otherwise holding the plates in their ultimate relative position.

11. A jig for holding the assembly of positive and negative storage battery plates and the permanent separators for the cell during the strap attaching operation, said jig including in combination, a base having means therein for accommodating a definite downward displacement of the separators from their final position with respect to the plates while otherwise holding the plates in their ultimate relative position, a wall fixed to said base for contact with one side of said assembly of plates and separators, and a wall opposite to said first wall and pivotally connected to said base for contact with the other side of said assembly of plates and separators.

12. A device for assembling the terminal posts and straps to storage battery plates which comprises, in combination, a jig adapted to receive the positive and negative plates having lugs thereon and the permanent separators between them, a burning box adapted to receive the jig and the plates therein, outer and inner burning irons adjustable to surround said lugs and to underlie said straps, said jig being provided with means for accommodating a definite downward displacement of the separators from their final position to provide space for the burning irons under the straps and over the separators, during the burning operation.    WALLACE NYCE.